United States Patent
Garmon

(10) Patent No.: US 7,825,908 B2
(45) Date of Patent: Nov. 2, 2010

(54) METHOD FOR RESETTING CONFIGURATION ON A TOUCHSCREEN INTERFACE

(75) Inventor: Richard W. Garmon, Harwinton, CT (US)

(73) Assignee: Carrier Corporation, Farmington, CT (US)

( * ) Notice: Subject to any disclaimer, the term of this patent is extended or adjusted under 35 U.S.C. 154(b) by 1059 days.

(21) Appl. No.: 11/501,141

(22) Filed: Aug. 8, 2006

(65) Prior Publication Data

US 2008/0036742 A1 Feb. 14, 2008

(51) Int. Cl.
G06F 3/041 (2006.01)
G06K 11/06 (2006.01)
G08C 21/00 (2006.01)

(52) U.S. Cl. .................................. 345/173; 178/18.01
(58) Field of Classification Search ... 178/18.01–20.04; 345/173–178
See application file for complete search history.

(56) References Cited

U.S. PATENT DOCUMENTS

| 5,790,114 A | * | 8/1998 | Geaghan et al. | 715/763 |
| 5,956,020 A | * | 9/1999 | D'Amico et al. | 345/173 |
| 6,742,129 B1 | | 5/2004 | Higgs et al. | |
| 7,362,315 B2 | * | 4/2008 | Homer et al. | 345/179 |

OTHER PUBLICATIONS

O'Reilly Media, Inc. "Windows XP Personal Trainer", Nov. 23, 2004, ISBN 0-596-00862-7, pp. 186-188.*

* cited by examiner

*Primary Examiner*—Alexander S. Beck
(74) *Attorney, Agent, or Firm*—Cantor Colburn LLP

(57) ABSTRACT

Factory settings of a touchscreen interface may be restored by cycling power off and on to initiate system startup while simultaneously touching the touchscreen. If a screen touch is in progress at system startup, the user is prompted to discontinue the screen touch, and then is prompted to touch the screen again before a timer expires in order to restore factory calibration settings. If there is no screen touch upon startup, or if the user does not touch the screen to restore factory settings within the timer period, existing user calibration is loaded, and the application is allowed to run with the user calibration settings.

11 Claims, 2 Drawing Sheets

METHOD FOR RESETTING CONFIGURATION ON A TOUCHSCREEN INTERFACE

BACKGROUND OF THE INVENTION

The present invention relates to a touchscreen interface for a computer-based system. In particular, the present invention provides a user with the ability to reset calibration of a touchscreen to original factory calibration settings.

A touchscreen (also known as a touch panel or touchscreen panel) allows a display device such as a cathode ray tube (CRT) or liquid crystal display (LCD), to also be used as an input device. The touchscreen is typically implemented as a display device overlay that is capable of electronically recognizing changes in resistance, current, or ultrasonic waves resulting from a screen touch. These changes are programmatically converted to screen coordinates in real time, and are acted upon by the application software for which the touchscreen is providing an interface.

The translation of the electrical input produced by a screen touch to screen coordinates requires a ratio conversion calculation that relies on a baseline calibration. Generally, touchscreen interfaces will include factory default calibration settings that are stored in non-erasable memory. In addition, a software calibration routine is provided to allow user calibration to adjust for misalignment of the touchscreen with respect to the display device. This misalignment may occur due to variances in the operating environment, as well as misalignments that occurred during the manufacturing process when the touchscreen is applied to the display device. A run time calibration interface is typically provided that requires the user to make a series of two or more screen touches at specific locations that are displayed by the display device. Based upon those touches, user calibration values are derived and stored, and then used to determine the location of any screen touch.

This user calibration procedure presents the potential for inaccurate calibration if the user touches the wrong portion of the screen during the calibration process. The user calibration may then yield incorrect coordinates of screen touches when the user later attempts to use the touchscreen interface. For example, as a result of incorrect user calibration, the user may attempt to touch the screen at a location where an icon is being displayed, but the output of the touchscreen interface is inaccurate enough that the system does not recognize that touch event as occurring at the location of the icon. The system may not activate a function because of the erroneous coordinates of the touch event, or may activate a function that is different than the one the user intended.

If the user calibration is severely in error, the system may be unresponsive. For those computer-based systems which include another user input device other than the touchscreen, a recalibration of the touchscreen may still be possible. Using this other input device, the user can interact with the system and be prompted through a procedure to recalibrate the touchscreen when it malfunctions.

One of the advantages of a touchscreen interface is that it eliminates the need for a separate keyboard or other user input device. For those systems having a touchscreen interface with no other user input device, an improper or erroneous user calibration can result in rendering the touchscreen either unresponsive, or responsive in an inappropriate manner. The user may not be able to provide an input which can lead to a recalibration routine to correct the erroneous user calibration values. As a result, the system may be unusable.

BRIEF SUMMARY OF THE INVENTION

The present invention provides a method to restore the original factory calibration settings of a touchscreen interface by initiating a startup of the system. This can be achieved by simply cycling power off and then back on while simultaneously touching the touchscreen.

When a startup occurs and no touch is detected using the stored factory calibration settings, the user calibration settings are loaded, and the underlying application is allowed to run. On the other hand, if a screen touch is detected on startup, the user is prompted to release the touch, and then is prompted to touch the screen again within a specified time period to reset calibration to the factory calibration settings.

DETAILED DESCRIPTION

Figure 1:
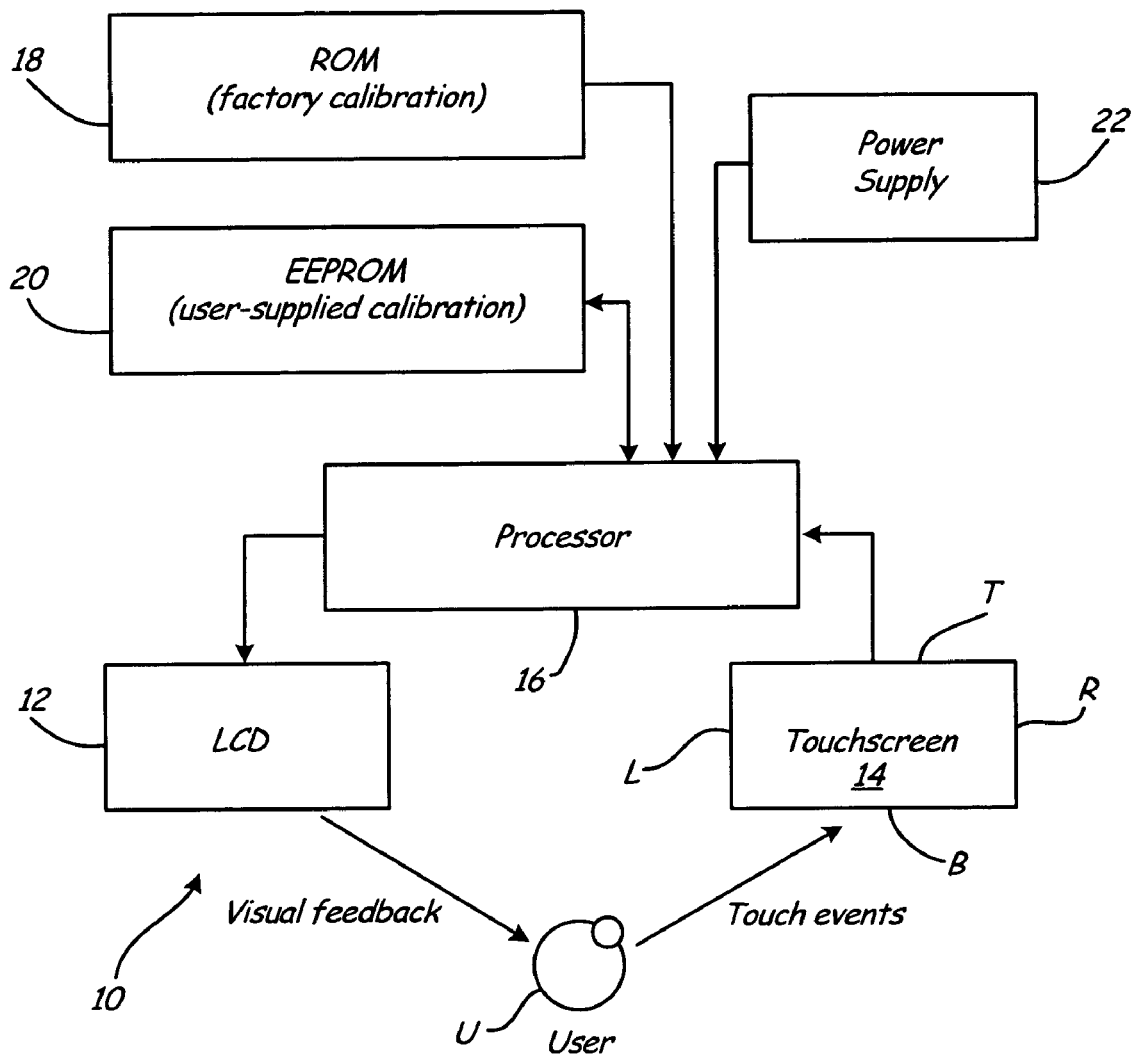
FIG. 1 is a block diagram of a system having a touchscreen interface.

FIG. 1 shows a block diagram of user interface system 10, which includes liquid crystal display (LCD) 12, touchscreen 14, processor 16, read only memory (ROM) 18, electrically erasable programmable read only memory (EEPROM) 20, and power supply 22. User interface system 10 allows user U to provide inputs to processor 16 by touching portions of touchscreen 16. Visual feedback and prompting messages to user U are provided by processor 16 through LCD 12. Touchscreen 14 is positioned in front of LCD 12, so that locations can be touched to provide a particular input are identified through messages and icons appearing on LCD 12.

Processor 16 receives touch event inputs from touchscreen 14 and provides display outputs to LCD 12. In interacting with user U through LCD 12 and touchscreen 14, processor 16 can make use of factory calibration data stored in ROM 18 as well as user supplied calibration data stored in EEPROM 20. Power to processor 16 is provided by power supply 22.

Processor 16 is programmed to run an application that accepts inputs from the user through touchscreen 14. The touch inputs are converted by processor 16 to screen coordinates and are acted upon by the application software for which touchscreen 14 is providing an interface. The application software may provide visual feedback to user U through LCD 12 in the form of messages and icons for further touch inputs. In addition, the application software may cause processor 16 to provide control outputs to other devices (not shown).

Touchscreen 14 is positioned in front of LCD 12, and is typically mounted as an overlay to LCD 12 during manufacturing. Touchscreen 14 electronically recognizes changes in a physical parameter, such as resistance, current, or ultrasonic waves resulting from a screen touch. The translation of the electrical inputs to screen coordinates requires a ratio conversion calculation that relies upon a baseline calibration.

In the specific case where touchscreen 14 is a pressure-sensitive (resistive) touchscreen, a screen touch is converted into screen coordinates by employing an analog-to-digital (A/D) converter can two planes (X and Y) of electrical current. The planes are alternately energized, and the resistance is measured in both directions. The A/D converter provides the resistance values in raw "counts", which are then used to calculate screen coordinates. This calculation relies on dimensions of the screen itself (often measured in pixels) and a baseline calibration setting consisting of the raw A/D output generated when pressure is is applied along the left (L), right (R), top (T) and bottom (B) boundaries of the touchscreen device. These four A/D readings will be referred to as TOUCH_AD_LEFT, TOUCH_AD_RIGHT, TOUCH_AD_TOP, and TOUCH_AD_BOTTOM. The conversion of raw A/D counts (RAWX, RAWY) to screen coordinates (X, Y) is a simple ratio:

$$X=(RAWX*XMAX)/(TOUCH\_AD\_RIGHT-TOUCH\_AD\_LEFT)$$

$$Y=(RAWY*YMAX)/(TOUCH\_AD\_BOTTOM-TOUCH\_AD\_TOP)$$

where XMAX and YMAX represent the maximum X and Y coordinates, respectively.

Initially, system 10 is provided with factory calibration values, which are a default setting which assumes that touchscreen 14 and LCD 12 have been aligned properly during the manufacturing process. The factory calibration values are stored in ROM 18 (or other non-volatile memory). The baseline values TOUCH_AD_LEFT, TOUCH_AD_RIGHT, TOUCH_AD_TOP, and TOUCH_AD_BOTTOM are typically measured using prototype (or pre-release) hardware, but the values are carried by the software for the life of the product.

Due to variances in operating environment and the way the overlays are applied, a runtime calibration interface is provided. This interface usually requires the user to make a series of two or more screen touches at specific X, Y coordinates. The application measures the raw A/D counts when those touches occur, and new user supplied calibration values for TOUCH_AD_LEFT, TOUCH_AD_RIGHT, TOUCH_AD_TOP, and TOUCH_AD_BOTTOM are calculated and used for future X, Y coordinate calculations.

After user interface 10 has been assembled, a calibration is performed at the factory to provide an initial set of user supplied calibration values, which are stored in EEPROM 20. These user supplied calibration values recognize that touchscreen 14 and LCD 12 may be slightly misaligned.

After system 10 has been placed in use, there may be a need for recalibration on the touchscreen. The application software provides an opportunity to user U to perform a user calibration of touchscreen 14. If the user elects to perform a calibration, the runtime calibration interface is provided by processor 16 through LCD 12. The interface requires user U to make a series of two or more screen touches at specific coordinates of touchscreen 14 (e.g. boundaries R, L, T and B). The application uses the values returned by touchscreen 14 when those touches occur, and those new values are converted to user-supplied calibration values and stored in EEPROM 20. Subsequent operation of touchscreen 14 uses those stored user-supplied calibration values.

Each time the user performs calibration, the new calibration values replace the previously stored user-supplied calibration values in EEPROM 20. This can present a problem if user U either inadvertently or deliberately miscalibrates touchscreen 14. When touchscreen 14 is touched in alignment with an icon displayed on LCD 12, processor 16 either may not recognize the screen touch as being associated with any particular icon, or may recognize the screen touch as a different icon than the one intended by user U. In either case, the calibration of touchscreen 14 has become so inaccurate as to render touchscreen 14 useless to the underlying application.

Once user miscalibration has rendered touchscreen 14 useless, user U is unable to supply a new set of user-supplied calibration values through touchscreen 14. If system 10 has a separate input device (such as a keyboard) to communicate with processor 16, recalibration can be initiated through that alternative input device. However, for those systems in which touchscreen 14 is the only user input device, an alternative approach to restoring calibration is needed.

In most cases, if touchscreen 14 is calibrated "past the point of no return," restoring the original factory calibration values stored in ROM 18 will be a sufficient remedy to at least facilitate another user calibration attempt. When touchscreen 14 provides the sole interface to the application, the method to reinstate the factory calibration must utilize the badly calibrated touchscreen 14 itself. In addition, the method implemented to reinstitute factory calibration values should guard against an inadvertent reset that was not requested by user U.

With the present invention, reestablishment of original factory calibration values can be achieved by a process in which the underlying application running in processor 16 is placed into a startup condition. This can be achieved by cycling power off and then back on, either by actuating a power switch, or by unplugging system 10 from line power and then replugging system 10 to reestablish power.

Upon startup of the underlying application, processor 16 initially uses the factory calibration values rather than the user-supplied calibration values to detect whether a screen touch is occurring. If a screen touch is detected upon startup at any location on touchscreen 14, processor 16 interprets the screen touch as a potential request to restore factory calibration values. Processor 16 then prompts user U to end the screen touch in order to continue the startup process. Once a screen touch is no longer detected, processor 16 then prompts user U with a message to again touch anywhere on touchscreen 14 in order to restore factory settings. If a touch is detected within a set time period, the user-supplied calibration values stored in EEPROM 20 are deleted and processor 16 continues using the factory calibration values. If the time period expires without a touch being detected, the user-supplied calibration values stored in EEPROM 20 are reinstated and the application continues.

With this process, user U is able to restore factory settings by cycling power to the hardware of system 10 while simultaneously touching touchscreen 14. Once the first message is presented, user U will release the touch. When the second message is presented, user U will have a number of seconds to accept the calibration reset by applying a second touch. The steps taken by user U are simple, easy to follow, and do not require an input device other than touchscreen 14 to rescue system 10 from a failure condition due to improper user calibration of touchscreen 14.

Figure 2:
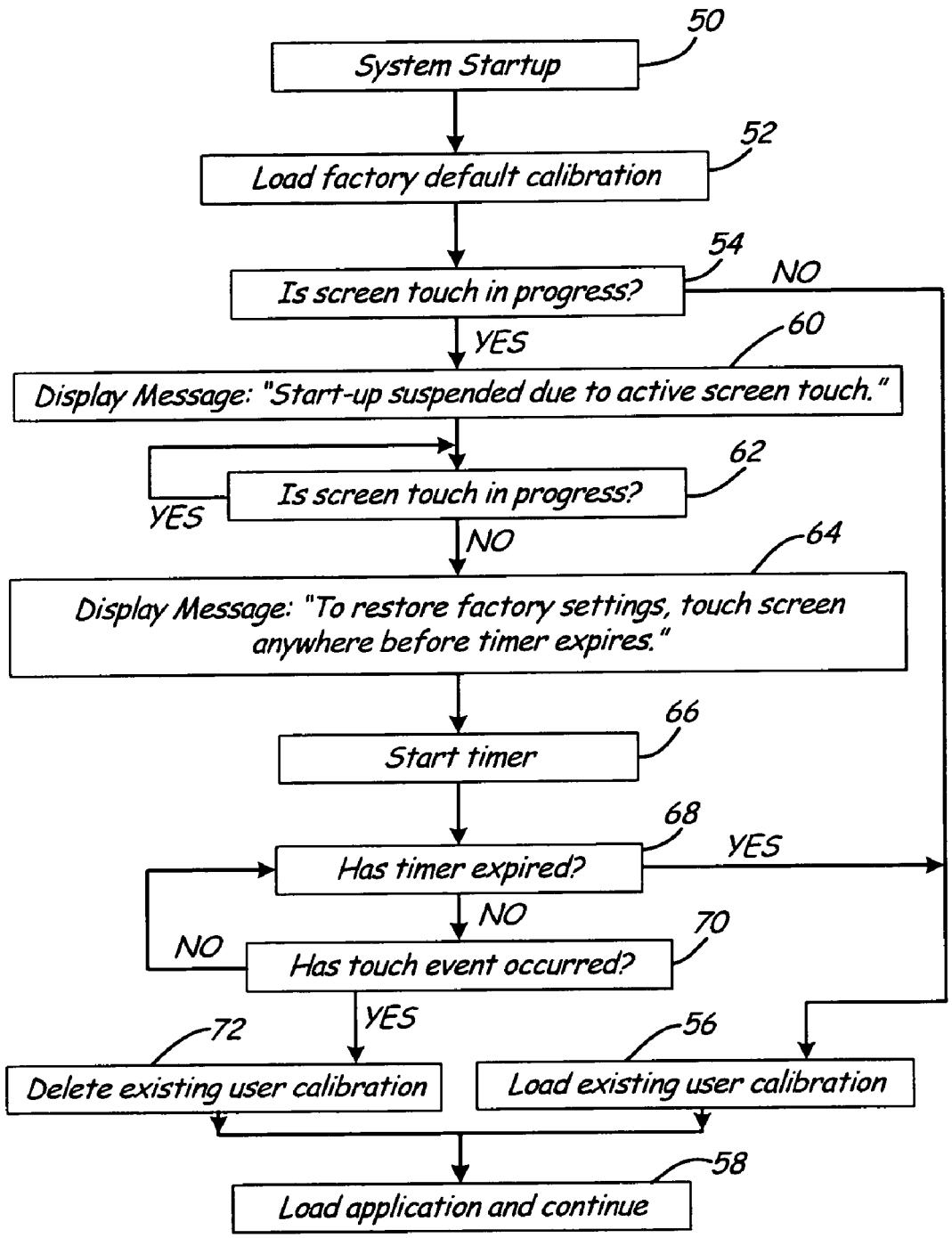
FIG. 2 is a flow diagram illustrating a method of resetting configuration of a touchscreen interface upon system startup.

FIG. 2 is a flow chart illustrating a method of restoring original factory calibration of touchscreen 14 in system 10. The process begins with system startup (step 50). User U can initiate system startup by cycling the power to system 10 off, and then back on. Upon system startup, processor 16 loads the factory default calibration values stored in ROM 18 (step 52).

Processor 16 then determines if a screen touch is in progress by examining the raw A/D counts from touchscreen 14 and comparing them to the factory calibration values of TOUCH_AD_LEFT, TOUCH_AD_RIGHT, TOUCH_AD_TOP, and TOUCH_AD_BOTTOM (step 54). If no touch is detected, the user-supplied calibration stored in EEPROM 20 is loaded (step 56), and the underlying application loaded and continues (step 58).

If a screen touch is detected, the core application will suspend itself until a touch is no longer active. During this period, processor 16 causes a message to be presented to user U through LCD 12 (step 60). The message may be: "Startup suspended due to active screen touch," or a similar message prompting the user U to discontinue the screen touch.

Processor 16 monitors whether a screen touch is still in progress (step 62). If so, it continues its monitoring, and will not continue with the startup process.

Once a screen touch is no longer detected, processor 16 uses LCD 12 to present a message prompting the user to again touch anywhere on touchscreen 14 in order to restore the factory calibration values (step 64). As shown in FIG. 2, the display message may be: "To restore factory settings, touch the screen anywhere before timer expires," or a similar message.

At this point, processor 16 starts a timer and begins a countdown (step 66). The value of the countdown may also be displayed on LCD 12, so that user U knows how much time remains to touch the screen before the timer runs out. In one embodiment, the timer duration is ten seconds, although shorter and longer times can be used.

Processor 16 disregards the user-supplied calibration values, and instead uses the factory calibration values to detect whether a touch event has occurred. Processor 16 monitors raw A/D counts from touchscreen 14, and compares them to the factory calibration values of TOUCH_AD_LEFT, TOUCH_AD_RIGHT, TOUCH_AD_TOP, and TOUCH_AD_BOTTOM. Processor 16 checks to see whether the timer has expired (step 68), and if not, whether a touch event has occurred (step 70). If the timer has not expired and a touch event has not occurred, processor 16 again checks the status of the timer and again checks whether a touch event has occurred. This continues until either the timer has expired or a touch event is detected.

If a touch is detected, the timer is stopped. The user-supplied calibration values in EEPROM 20 are deleted (step 72) and the application is allowed to continue (step 58).

If the timer expires without a touch being detected, the user-supplied calibration values are reinstated (step 56). The application is then allowed to continue (step 58).

This process provides a simple way to restore factory calibration settings by simply cycling power off and on while simultaneously touching the touchscreen. It relies upon the permanent retention of the factory calibration values in non-volatile memory (such as ROM 18, EEPROM, or flash memory).

Suspending the startup process if a touch is detected and subsequently requiring a second touch to perform the calibration reset prevents an accidental touch from invoking the reset logic. If user U or an object happens to be leaning against touchscreen 14 at the time of startup, that touch, which was not intended to cause a calibration reset, is not effective to reset calibration to the default factory settings unless verified by further action by user U.

Providing a message and a visual countdown allows user U to cancel the reset. All that is required to discontinue the reset process is that the user U not touch the screen during the timer period.

This process provides a touchscreen system with a run time calibration interface that includes a calibration reset if user miscalibration has occurred. A dedicated hardware reset button, or other independent input mechanism, is not required to restore factory settings, which reduces design, development, and manufacturing costs for touchscreen 14. The recalibration process is also simple to document and easy to use.

Although the present invention has been described with reference to preferred embodiments, workers skilled in the art will recognize that changes may be made in form and detail without departing from the spirit and scope of the invention.

The invention claimed is:

1. A method of resetting calibration on a touchscreen interface system having a processor, the processor programmed to perform the method comprising:
    upon system startup, using stored factory calibration settings for determination of touch locations on the touchscreen;
    determining if a screen touch has occurred during system startup initiation;
    prompting a user to interact with the touchscreen to reset calibration to the stored factory calibration settings if a screen touch has occurred during system startup initiation;
    selecting stored existing user calibration settings if a screen touch has not occurred during system startup initiation; and
    selecting the stored factory calibration settings based upon interaction of the user with the touchscreen in response to the prompting.

2. The method of claim 1 and further comprising:
    initiating system startup by turning power off and then on.

3. The method of claim 2 and further comprising:
    waiting for a defined time period during which the user must touch the touchscreen to restore the stored factor calibration settings.

4. The method of claim 3 and further comprising:
    displaying a timer value representative of a time period remaining in the defined time period.

5. The method of claim 1, wherein prompting the user to interact comprises:
    displaying a message prompting the user to discontinue the screen touch during startup; and
    displaying a message prompting the user to again touch the touchscreen to restore the stored factory calibration settings.

6. A method of resetting calibration of a touchscreen interface system having a processor, the processor programmed to perform the method comprising:
    cycling power off and on to initiate system startup;
    detecting a first screen touch while system startup is being initiated, using stored factory calibration settings;
    prompting a user to discontinue the first screen touch;
    prompting the user to produce a second screen touch to select the factory calibration settings;
    selecting the factory calibration settings for use in determining screen touch locations if the second screen touch is detected; and
    selecting stored user calibration settings for use in determining screen touch locations if either the first screen touch or the second screen touch is not detected.

7. The method of claim 6, wherein prompting the user to discontinue the first screen touch comprises displaying a message on a display associated with the touchscreen.

8. The method of claim 7, wherein prompting the user to produce a second screen touch comprises displaying a message and a timer value on the display.

9. The method of claim 8, wherein the timer value is representative of time remaining within which to produce the second screen touch in order to select the factory calibration settings.

10. The method of claim 6, wherein detecting the first screen touch is based upon the factory calibration settings.

11. The method of claim 6, wherein the first and second screen touches are detected if the user touches anywhere on the touchscreen.

* * * * *